US012053785B1

(12) United States Patent
Li et al.

(10) Patent No.: US 12,053,785 B1
(45) Date of Patent: Aug. 6, 2024

(54) CONE CRUSHER AND ADJUSTABLE MOVING CONE ASSEMBLY THEREOF

(71) Applicant: ZHEKUANG HEAVY INDUSTRY CO., LTD., Huzhou (CN)

(72) Inventors: Guoqiang Li, Huzhou (CN); Mengjun Zhao, Huzhou (CN); Bingmin Chen, Huzhou (CN); Cheng Yuan, Huzhou (CN); Yucheng Chu, Huzhou (CN); Lihua Chen, Huzhou (CN)

(73) Assignee: ZHEKUANG HEAVY INDUSTRY CO., LTD., Huzhou (CN)

( * ) Notice: Subject to any disclaimer, the term of this patent is extended or adjusted under 35 U.S.C. 154(b) by 0 days.

(21) Appl. No.: 18/388,537

(22) Filed: Nov. 10, 2023

Related U.S. Application Data

(63) Continuation of application No. PCT/CN2023/082386, filed on Mar. 20, 2023.

(30) Foreign Application Priority Data

Jan. 17, 2023 (CN) ........................ 202310092885.1

(51) Int. Cl.
*B02C 2/02* (2006.01)
*B02C 2/00* (2006.01)
(Continued)

(52) U.S. Cl.
CPC .............. *B02C 2/047* (2013.01); *B02C 2/005* (2013.01); *B02C 2/02* (2013.01); *B02C 2/06* (2013.01)

(58) Field of Classification Search
CPC .. B02C 2/02; B02C 2/04; B02C 2/047; B02C 2/06
See application file for complete search history.

(56) References Cited

U.S. PATENT DOCUMENTS 2,908,448 A * 10/1959 Macleod ................ B02C 2/047 241/215
3,372,881 A * 3/1968 Winter .................... B02C 25/00 241/290
(Continued)

FOREIGN PATENT DOCUMENTS

CN 101084067 A 12/2007
CN 101160174 A 4/2008
(Continued)

*Primary Examiner* — Faye Francis
(74) *Attorney, Agent, or Firm* — Bayramoglu Law Offices LLC

(57) ABSTRACT

A cone crusher and an adjustable moving cone assembly thereof are provided. The adjustable moving cone assembly includes a base, an eccentric bushing movably provided inside the base, a main shaft with a lower end movably provided inside the eccentric bushing, and a moving cone body fastened at an upper end of the main shaft. The eccentric bushing rotates to directly or indirectly drive the moving cone body to swing circumferentially. A lifting drive component is provided on the base. An upper end surface of the lifting drive component is provided with a support assembly. A lower end of the moving cone body is supported by rolling or sliding on the support assembly. The lifting drive component is configured to drive the moving cone body and the main shaft connected to the moving cone body to move up and down.

20 Claims, 15 Drawing Sheets

(51) Int. Cl.
*B02C 2/04* (2006.01)
*B02C 2/06* (2006.01)

(56) References Cited

U.S. PATENT DOCUMENTS

| | | | | | |
|---|---|---|---|---|---|
| 4,681,269 | A * | 7/1987 | Arakawa | B02C 2/047<br>241/215 |
| 4,895,311 | A * | 1/1990 | Arakawa | B02C 2/047<br>241/207 |
| 7,699,253 | B2 * | 4/2010 | Niklewski | B02C 2/047<br>241/207 |
| 8,215,576 | B2 * | 7/2012 | Martinez, Jr. | B02C 2/047<br>241/245 |
| 9,308,532 | B2 * | 4/2016 | Fried | B02C 2/06 |
| 10,512,916 | B2 * | 12/2019 | Szczelina | B02C 2/045 |
| 2008/0272218 | A1 | 11/2008 | Niklewski | |
| 2010/0116915 | A1 * | 5/2010 | Norrman | B02C 2/047<br>241/215 |

FOREIGN PATENT DOCUMENTS

| | | | |
|---|---|---|---|
| CN | 101433869 | A | 5/2009 |
| CN | 103671576 | A | 3/2014 |
| CN | 203916738 | U | 11/2014 |
| CN | 104437725 | A | 3/2015 |
| CN | 104525307 | A | 4/2015 |
| CN | 104549624 | A | 4/2015 |
| CN | 104588161 | A | 5/2015 |
| CN | 204365380 | U | 6/2015 |
| CN | 204448110 | U | 7/2015 |
| CN | 205288514 | U | 6/2016 |
| CN | 113042138 | B | 4/2022 |
| DE | 2528237 | A1 | 1/1976 |
| KR | 20130104299 | A | 9/2013 |
| KR | 101372920 | B1 | 3/2014 |
| SU | 637142 | A2 | 12/1978 |
| WO | 2005102530 | A1 | 11/2005 |

* cited by examiner

CONE CRUSHER AND ADJUSTABLE MOVING CONE ASSEMBLY THEREOF

CROSS REFERENCE TO THE RELATED APPLICATIONS

This application is the continuation application of International Application No. PCT/CN2023/082386, filed on Mar. 20, 2023, which is based upon and claims priority to Chinese Patent Application No. 202310092885.1, filed on Jan. 17, 2023, the entire contents of which are incorporated herein by reference.

TECHNICAL FIELD

The present disclosure relates to the field of material crushing machinery, and in particular to a cone crusher and an adjustable moving cone assembly thereof.

BACKGROUND

Cone crushers are widely used in industries such as construction stone, metallurgy, and chemical engineering. Based on the differences in the structural principles of a cone crusher and the movement trajectory of crushed materials, cone crushers are divided into two categories: 1. a single-cylinder cone crusher; and 2. a multi-cylinder cone crusher. The movement trajectory of the multi-cylinder cone crusher can yield products that have an excellent particle size and a high reduction ratio. Therefore, the multi-cylinder cone crusher is a high-end device widely used in iron ore and non-ferrous metal mines.

At present, the multi-cylinder cone crusher (as provided by Chinese patent CN113042138B) mainly discharges tramp metals through the passive lifting action of a plurality of hydraulic cylinders in terms of tramp metal protection, and achieves the adjustment of the discharge port mainly through the spiral adjustment of the upper frame. The spiral adjustment method is driven by a driving gear, which has problems such as poor adjustment accuracy, low efficiency, and high maintenance costs due to the involvement of many components. In addition, due to structural limitations, the existing multi-cylinder cone crushers cannot adjust the discharge port in a power-on feeding state.

In the existing multi-cylinder cone crusher provided by Chinese patent CN113042138B, as shown in FIG. 16, the moving cone body 4 of the moving cone assembly of the multi-cylinder cone crusher is sleeved on the outer side of the eccentric bushing 2. The moving cone assembly is provided on the upper end of the fixed vertical shaft 50. The lower part of the moving cone assembly and the upper end of the fixed vertical shaft 50 are provided with a spherical up-down thrust plate 60. During operation, the eccentric bushing 2 rotates to drive the moving cone assembly to swing circumferentially. The moving cone lining plate is matched with the fixed cone lining plate to achieve material crushing.

Due to the excessive axial force borne by the matching mechanism between the eccentric bushing 2 and the moving cone body 4, the spherical up-down thrust plate 60 is located at the upper end of the fixed vertical shaft 50 to support the moving cone assembly, so as to achieve load-bearing and swinging. When the multi-cylinder cone crusher operates for a long time or is in a state of skewed feeding or encounters a tramp metal, the radial and axial forces borne by the moving cone assembly act on the fixed vertical shaft 50. As a result, the joint 52 between the fixed vertical shaft 50 and the lower frame 51 is prone to loosening and cracking, and even breaking of the fixed vertical shaft 50, thereby affecting the stable operation of the multi-cylinder cone crusher.

SUMMARY

In order to solve the above problem, a first objective of the present disclosure is to solve the problem that the existing multi-cylinder cone crusher is unable to adjust the discharge port in a power-on feeding state, resulting in the inability to understand the size of the discharge port in real time and improve the level of automation. In view of this, the present disclosure provides an adjustable moving cone assembly with a function of adjusting a discharge port of a crushing chamber.

To achieve the above objective, the present disclosure adopts the following technical solutions:

An adjustable moving cone assembly includes a base, an eccentric bushing movably provided inside the base, a main shaft with a lower end movably provided inside the eccentric bushing, and a moving cone body fastened at an upper end of the main shaft, where the eccentric bushing rotates to directly or indirectly drive the support assembly to rotate, such that the moving cone body swings, with an edge undulating, in a circumferential direction; a lifting drive component is provided on the base; an upper end surface of the lifting drive component is provided with a support assembly; a lower end of the moving cone body is supported by rolling or sliding on the support assembly; and the lifting drive component is configured to drive the moving cone body, the main shaft connected to the moving cone body, and the support assembly to move up and down.

The above technical solution of the present disclosure relates to an adjustable moving cone assembly. In the moving cone assembly, the lower end of the main shaft passes through the eccentric bushing, and a middle part of the moving cone body is connected to the upper end of the main shaft. The eccentric bushing rotates to directly or indirectly drive the moving cone body to swing circumferentially.

In this solution, the lifting drive component is provided on the base. The lifting drive component can drive the support assembly to move up and down, thereby driving the moving cone body and the main shaft connected to the moving cone body to move up and down. With this structure, a function of adjusting the discharge port of the crushing chamber is incorporated into the moving cone assembly. Thus, a fixed cone body can be provided on an upper frame, simplifying the structure, reducing the components, and reducing costs.

In this solution, the multi-cylinder cone crusher has the movement trajectory of the existing multi-cylinder cone crusher and solves the problem that the existing multi-cylinder cone crusher is unable to adjust its moving cone assembly.

In a further implementation solution, the support assembly is sleeved on an outer side of the eccentric bushing, and performs circumferential linkage and axial sliding with the eccentric bushing; an upper end surface of the support assembly forms a continuous inclined surface that gradually changes in a circumferential height; a lower end surface of the support assembly is supported by rolling or sliding on an upper end surface of the lifting drive component; the lower end of the moving cone body is supported on the continuous inclined surface of the support assembly; and the eccentric bushing drives the moving cone body to swing circumferentially through the support assembly. In this solution, the outer side of the eccentric bushing is provided with the support assembly that is in circumferential linkage with the eccentric bushing. Circumferential linkage means that the eccentric bushing drives the support assembly to rotate when it rotates. In this solution, the lower end of the support assembly is supported by the lifting drive component, and the upper end surface of the support assembly forms a continuous inclined surface that gradually changes in a circumferential height. The lower end of the moving cone body is supported by rolling on the support assembly. In this solution, when the eccentric bushing rotates, it directly drives the main shaft and the moving cone body on the main shaft to swing circumferentially, and drives the support assembly to rotate, such that the moving cone body swings, with an edge undulating, in a circumferential direction.

During the operation of the moving cone assembly, the eccentric bushing drives the support assembly to rotate so as to swing the moving cone body, and the moving cone body is supported by the base. The design rationalizes the supporting structure of the moving cone body and optimizes the load-bearing structure. Most of the axial force of the moving cone body is directly transmitted from the base to the lower frame, and the radial force of the moving cone body is transmitted to the base and further to the lower frame through the eccentric bushing mechanism. Compared to the fixed main shaft solution mentioned in the Background, this solution eliminates the fixed main shaft, making the force borne by the moving cone body more dispersed and uniform, and making the moving cone body less prone to damage and more stable in operation. Therefore, the design improves the swing frequency of the moving cone assembly, ultimately improving the crushing efficiency.

In a specific implementation solution, the support assembly includes a lower support ring and an upper support ring; the lower support ring is directly or indirectly sleeved on the outer side of the eccentric bushing, and performs circumferential linkage and axial sliding with the eccentric bushing; the upper support ring is provided above the lower support ring, and performs circumferential linkage and radial sliding with the lower support ring; the lower support ring is provided by rolling or sliding on the upper end surface of the lifting drive component; an upper end surface of the upper support ring forms a continuous inclined surface that gradually changes in a circumferential height; and the lower end of the moving cone body is supported by rolling or sliding on the upper support ring. In this solution, the support assembly is divided into two parts: the lower support ring and the upper support ring. The lower support ring is configured to connect the eccentric bushing for circumferential synchronous rotation with the eccentric bushing. The upper support ring is circumferentially synchronized with the lower support ring to achieve radial sliding adjustment. In this way, when the lifting drive component drives the support assembly, the moving cone body, and the main shaft to move up and down, the upper support ring radially slides relative to the lower support ring. Thus, a radial misalignment of the lifting drive component caused during height adjustment of the moving cone assembly is compensated.

In a further solution, an outer wall of the eccentric bushing is axially provided with eccentric bushing sliding grooves, and an inner ring of the lower support ring or the upper support ring is provided with internal key teeth embedded in the eccentric bushing sliding grooves. In a solution, the internal key teeth are clamped into the eccentric bushing sliding grooves and can move along the eccentric bushing sliding grooves. In this solution, the lower support ring or the upper support ring is directly engaged and linked with the outer wall of the eccentric bushing.

In another implementation solution, the outer wall of the eccentric bushing is sleeved with a connecting ring, and the lower support ring or the upper support ring is sleeved on the connecting ring. The eccentric bushing, the connecting ring, and the lower support ring or the upper support ring are circumferentially linked. In this solution, the connecting ring serves as an intermediate connecting element with inner and outer sides respectively connected to the eccentric bushing and the lower support ring or the upper support ring. Specifically, the connecting ring includes an inner ring provided with inner sliding grooves and an outer ring provided with outer sliding grooves. The inner sliding grooves are engaged with the eccentric bushing sliding grooves, and the outer sliding grooves are engaged with the internal key teeth. Further, in this solution, at least one of the inner side and the outer side of the connecting ring achieves axial sliding. Specifically, only the inner side achieves axial sliding, that is, the connecting ring and the eccentric bushing achieve axial sliding. Alternatively, only the outer side achieves axial sliding, that is, the connecting ring and the lower support ring achieve axial sliding. Alternatively, both the inner and outer sides achieve axial sliding.

In a further solution, an upper end surface of the lower support ring and a lower end surface of the upper support ring respectively form a sliding groove and a slider that are radially arranged; and the slider is embedded in the sliding groove to achieve circumferential linkage and radial sliding between the upper support ring and the lower support ring. In this solution, the positions of the sliding groove and the slider are interchangeable.

In a specific implementation solution, a top surface of the upper support ring is recessed downwards to form a top bearing groove, and a bottom surface of the top bearing groove forms a continuous inclined surface that gradually changes in a circumferential height; a first rolling bearing or a first sliding bearing is embedded in the top bearing groove; and the lower end of the moving cone body is supported on the continuous inclined surface of the upper support ring through the first rolling bearing or the first sliding bearing. In this solution, the first rolling bearing or the first sliding bearing is positioned in the top bearing groove. The first rolling bearing realizes rolling support between the moving cone body and the upper support ring, or the first sliding bearing realizes sliding support between the moving cone body and the upper support ring.

A bottom surface of the lower support ring and a top surface of the lifting drive component each form a bottom bearing groove; a second rolling bearing or a second sliding bearing is provided in the bottom bearing groove; and a lower end surface of the lower support ring is supported on the upper end surface of the lifting drive component through the second rolling bearing or the second sliding bearing. In this solution, the lower end of the lower support ring is supported by the second rolling bearing or the second sliding bearing on the upper end surface of the lifting drive component, such that the pressure of the moving cone body is ultimately borne by the lower frame, and the second rolling bearing or the second sliding bearing ensures smooth circumferential rotation of the lower support ring.

The first rolling bearing and the second rolling bearing are thrust bearings, each with an outer side sealed by a labyrinth sealing ring.

Preferably, the eccentric bushing includes a bottom part provided with an eccentric part and a top part provided with a concentric part; the main shaft enters from the top part of the eccentric bushing and extends at least to the eccentric part of the eccentric bushing; and the support assembly is sleeved on an outer side of the concentric part of the eccentric bushing and is in circumferential linkage with the concentric part. In this solution, the eccentric bushing is divided into two parts: the eccentric part and the concentric part. The main shaft enters from the top part of the eccentric bushing and extends at least to the eccentric part of the eccentric bushing. In this way, when the eccentric bushing rotates, it can drive the main shaft and the moving cone body to swing circumferentially. The support assembly is provided on the outer side of the concentric part of the eccentric bushing to ensure that the eccentric bushing drives the support assembly to rotate.

In a first implementation solution, the outer side of the eccentric bushing and an inner wall of the base are in a clearance fit through an outer copper sleeve, and an inner wall of the eccentric bushing and an outer wall of the main shaft are in a clearance fit through an inner copper sleeve.

In a second implementation solution, the outer side of the eccentric bushing and the inner wall of the base are in a clearance fit through the outer copper sleeve, and the inner wall of the eccentric bushing and the outer wall of the main shaft are in a rotation fit through the inner bearing.

In a third implementation solution, the outer side of the eccentric bushing and the inner wall of the base are in a rotation fit through the outer bearings, and the inner wall of the eccentric bushing and the outer wall of the main shaft are in a clearance fit through the inner copper sleeve.

In a fourth implementation solution, the outer side of the eccentric bushing and the inner wall of the base are in a rotation fit through the outer bearings, and the inner wall of the eccentric bushing and the outer wall of the main shaft are in a rotation fit through the inner bearing.

In the above solution, the pressure of the moving cone body is borne by the base. During the operation of the moving cone assembly, the eccentric bushing drives the support assembly to rotate so as to swing the moving cone body, and the moving cone body is supported by the base. The design rationalizes the supporting structure of the moving cone body and optimizes the load-bearing structure. Most of the axial force of the moving cone body is directly transmitted from the base to the lower frame, and the radial force of the moving cone body is transmitted to the base and further to the lower frame through the eccentric bushing mechanism. The force borne by the moving cone body is more dispersed and uniform, and the moving cone body is less prone to damage and more stable in operation. In this way, the copper sleeve clearance fit can be replaced with a bearing rolling fit, which has the following advantages.

(1) The bearing rolling fit features a novel and unique structure and smooth operation (mainly reflected in reducing vibration caused by clearance).

(2) The bearing rolling fit replaces the sliding bearing with a rolling bearing to achieve rotation between the base and the eccentric bushing, as well as between the eccentric bushing and the main shaft. The rolling bearing increases the speed of the eccentric bushing, thereby improving the swing frequency of the moving cone assembly and improving the crushing efficiency of the cone crusher.

(3) The bearing rolling fit reduces the friction coefficient between the eccentric bushing and the main shaft, prolongs the service life of the machine, and reduces the energy consumption of the equipment.

In a specific implementation solution, an outer wall of the eccentric part of the eccentric bushing radially protrudes to form an eccentric ring part; the eccentric ring part axially separates the outer wall of the eccentric bushing into an upper bearing mounting surface and a lower bearing mounting surface; and the upper bearing mounting surface and the lower bearing mounting surface are respectively provided with the outer bearings, and are positioned and separated by the eccentric ring part. In this solution, considering the larger radial space required for bearing mounting, the upper bearing mounting surface and the lower bearing mounting surface are formed on the outer wall of eccentric bushing for mounting the two sets of outer bearings respectively. The eccentric ring part plays a role in eccentric driving and in spacing and positioning the two sets of outer bearings.

Further, the lower support ring or the upper support ring or the connecting ring is detachably connected to an outer side wall of the eccentric bushing and is in circumferential linkage with the eccentric bushing; a lower end of the base is fixedly connected to a bottom support cover; and the bottom support cover supports the outer bearing at a lower side. In this solution, in order to facilitate the disassembly and assembly of the two sets of outer bearings, the lower support ring and the eccentric bushing are separated, thereby facilitating the disassembly and assembly of the upper outer bearing. The bottom support cover below is configured to support the lower outer bearing, and the bottom support cover can be disassembled when the outer bearing needs to be disassembled.

Preferably, the lower end of the main shaft passes through the inner copper sleeve and performs axial movement and circumferential rotation relative to the inner copper sleeve; and alternatively, the main shaft passes through an inner race of the inner bearing and performs circumferential linkage and axial sliding with the inner race. In the above solution, the moving cone body and the main shaft are driven to move up and down through the lifting drive component. On this basis, in order to ensure axial movement of the main shaft relative to the eccentric bushing, clearance fit is employed to perform axial movement when the inner copper sleeve is provided for connecting. When the inner bearing is provided for rotation connection, while the circumferential synchronous rotation is ensured, the main shaft can perform axial movement relative to the inner race.

In a further solution, the base is circumferentially provided with a continuous or spaced piston chamber; the base forms an oil passage communicated with the piston chamber; and the lifting drive component is a piston located inside the piston chamber, and the piston moves along the piston chamber under the action of a hydraulic pressure.

In another alternative solution, a hydraulic cylinder is provided in the lower frame below the base; an upper end surface of the hydraulic cylinder is provided with a lifting seat; a top shaft that is movable and runs through upper and lower end surfaces of the base is provided inside the base; a lower end of the top shaft is provided on the lifting seat; an upper end of the top shaft passes through the base and is supported against the bearing seat; the bearing seat is provided above the base; and the support assembly is provided on the bearing seat.

In this solution, hydraulic lifting is controlled through the oil passage to achieve lifting drive. The hydraulic lifting method has the advantages of high strength, high stability, and easy control through a hydraulic valve. The hydraulic lifting method can especially achieve the adjustment of a discharge port of the crushing chamber during operation.

Further, the hydraulic lifting method can accurately set the pressure value and play a role in tramp metal protection. That is, when an uncrushable tramp metal falls into the discharge port of the crushing chamber, moving cone lining plate is subjected to a greater downward pressure. An appropriate hydraulic value allows the moving cone body and the main shaft to travel down for a certain distance to allow the tramp metal to pass through. After the tramp metal is discharged, the moving cone body and the main shaft can quickly reset and work. This design ensures the normal operation of the equipment.

A second objective of the present disclosure is to provide a cone crusher. The cone crusher includes a lower frame, an upper frame, a transmission system and a moving cone assembly that are provided inside the lower frame, and a fixed cone lining plate provided inside the upper frame, where a crushing chamber is formed between a moving cone lining plate of the moving cone assembly and the fixed cone lining plate; and the moving cone assembly is the above-mentioned adjustable moving cone assembly. In the cone crusher with the adjustable moving cone assembly, the fixed cone lining plate is fixedly provided, and there is no need for a discharge port adjustment structure, thereby simplifying the structure, reducing the components, and reducing costs.

A third objective of the present disclosure is to combine the adjustable moving cone assembly with an upper frame and a fixed cone adjustment mechanism of an existing multi-cylinder cone crusher, providing secondary (dual) protection against the tramp metal and using the ultra-thick lining plates. In case a large tramp metal enters the crushing chamber, the upper frame is raised, and the moving cone assembly is lowered, allowing the tramp metal to pass quickly, thereby reducing the impact on the frame, the bearing, and other components.

Adjustable strokes of the moving cone assembly and the fixed cone lining plate are superimposed, increasing the adjustment range, allowing the use of ultra-thick lining plates. In case wear of the ultra-thick lining plate occurs, automatic or manual lifting compensation can be carried out, thereby extending the service life of the lining plate, improving the utilization of the lining plate, reducing the replacement frequency, reducing costs, and improving efficiency.

DETAILED DESCRIPTION OF THE EMBODIMENTS

Figure 1:
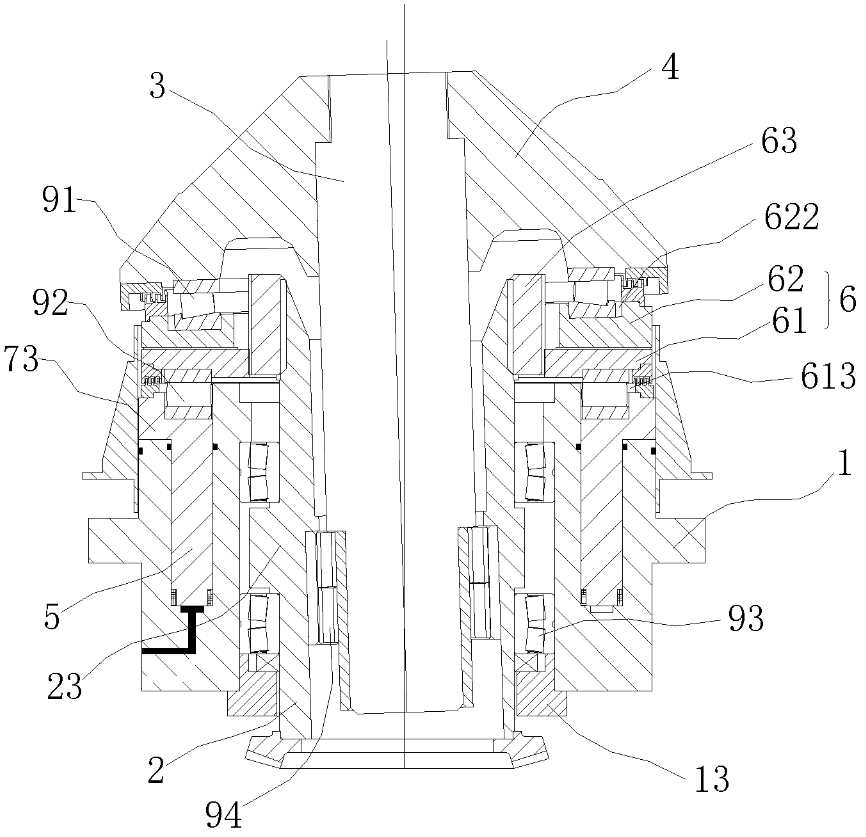
FIG. 1 is a basic structural diagram of an adjustable moving cone assembly according to Embodiment 1 of the present disclosure.
Figure 2:
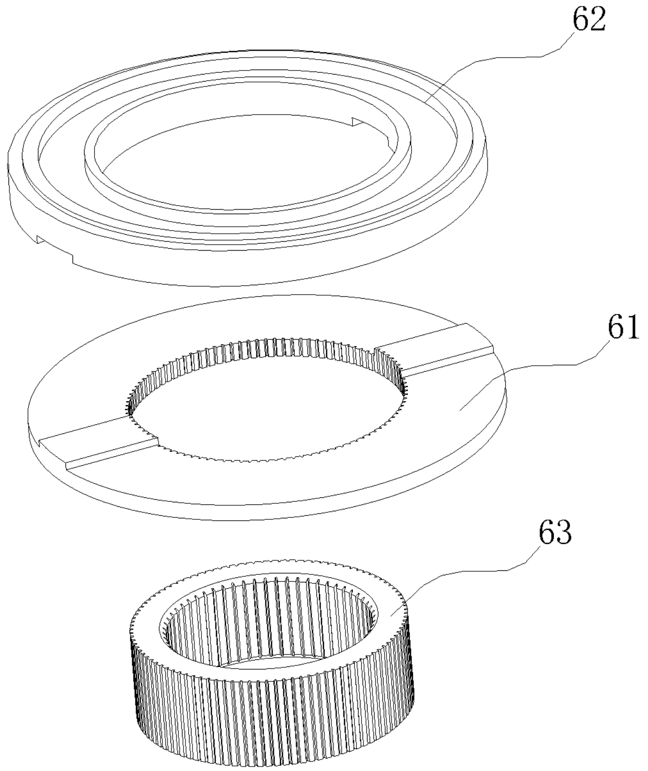
FIG. 2 is an exploded view of a support assembly.

The embodiments of the present disclosure are described below in detail. Examples of the embodiments are shown in the drawings. The same or similar numerals represent the same or similar elements or elements having the same or similar functions throughout the specification. The embodiments described below with reference to the drawings are illustrative for explaining the present disclosure and are not to be construed as limiting the present disclosure.

It should be understood that, in the description of the present disclosure, the terms such as "central", "longitudinal", "transverse", "long", "wide", "thick", "upper", "lower", "front", "back", "left", "right", "vertical", "horizontal", "top", "bottom", "inner", "clockwise" and "anti-clockwise" are intended to indicate orientations or positional relations shown in the drawings. It should be noted that these terms are merely intended to facilitate a simple description of the present disclosure, rather than to indicate or imply that the mentioned apparatus or elements must have the specific orientation or be constructed and operated in the specific orientation. Therefore, these terms may not be construed as a limitation to the present disclosure.

In addition, the terms "first" and "second" are merely intended for a purpose of description, and shall not be understood as an indication or implication of relative importance or implicit indication of a quantity of indicated technical features. Thus, features defined with "first" and "second" may explicitly or implicitly include one or more of the features. In the description of the present disclosure, unless otherwise specifically defined, "a plurality of" means two or more.

In the present disclosure, unless otherwise clearly specified and defined, meanings of terms "install", "connect with", "connect to" and "fixed to" should be understood in a broad sense. For example, the connection may be a fixed connection, a removable connection, or an integral connection; may be a mechanical connection or an electrical connection; may be a direct connection or an indirect connection via a medium; or may be intercommunication between two components. Those of ordinary skill in the art may understand specific meanings of the above terms in the present disclosure based on a specific situation.

In the present disclosure, unless otherwise expressly specified, when it is described that a first feature is "above" or "under" a second feature, it may indicate that the first feature is in direct contact with the second feature, or that the first feature and the second feature are not in direct contact with each other but are in contact via another feature between them. In addition, that the first feature is "over", "above", and "on" the second feature includes that the first feature is directly above and diagonally above the second feature, or simply indicates that a horizontal height of the first feature is larger than that of the second feature. "A first feature is under and below a second feature" includes "the first feature is directly under or obliquely under the second feature" or simply means that "the first feature is lower than the second feature".

Embodiment 1

As shown in FIGS. 1 to 13, this embodiment relates to an adjustable moving cone assembly. The adjustable moving cone assembly includes base 1, eccentric bushing 2 movably provided inside the base 1, main shaft 3 with a lower end movably provided inside the eccentric bushing 2, and moving cone body 4 fastened at an upper end of the main shaft 3. The eccentric bushing 2 rotates to directly or indirectly drive the moving cone body 4 to swing circumferentially. Lifting drive component 5 is provided on the base 1. An upper end surface of the lifting drive component 5 is provided with support assembly 6. A lower end of the moving cone body 4 is supported by rolling or sliding on the support assembly 6. The lifting drive component 5 is configured to drive the moving cone body 4 and the main shaft 3 connected to the moving cone body 4 to move up and down.

In the moving cone assembly, the lower end of the main shaft 3 passes through the eccentric bushing 2, and a middle part of the moving cone body 4 is connected to the upper end of the main shaft 3. The eccentric bushing 2 rotates to drive the support assembly 6 to rotate, thereby driving the moving cone body 4 to swing circumferentially. Of course, this embodiment proposes a preferred eccentric drive solution, as described below. On the basis of the above structure, in this solution, the lifting drive component 5 is provided on the base 1. The lifting drive component 5 can drive the support assembly 6 to move up and down, thereby driving the moving cone body 4 and the main shaft 3 connected to the moving cone body 4 to move up and down. With this structure, a function of adjusting the discharge port of the crushing chamber is incorporated into the moving cone assembly. Thus, a fixed cone can be provided on an upper frame, simplifying the structure, reducing the components, and reducing costs.

Figure 3:
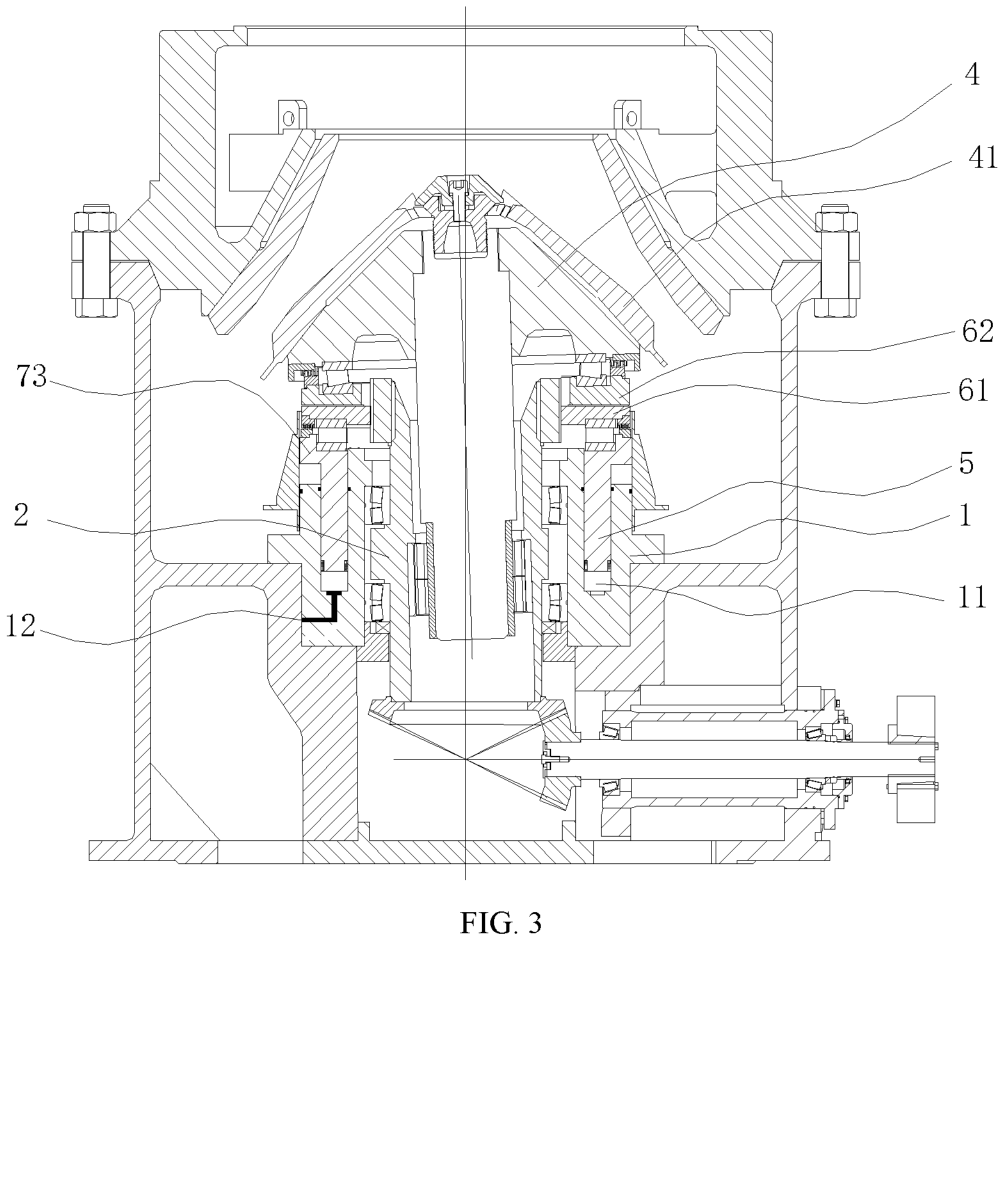
FIG. 3 is a schematic diagram of the adjustable moving cone assembly in a raised state.

In the implementation solution shown in FIG. 3, the base 1 is provided with piston chamber 11 that is continuous along a circumferential direction of the base, and the base 1 forms oil passage 12 communicated with the piston chamber 11. In the implementation solution shown in FIG. 7, the base 1 is provided with piston chamber 11 that is spaced along the circumferential direction of the base, and the base 1 or the base 1 and lower frame 101 below the base 1 form oil passage 12 communicated with the piston chamber 11. In the two solutions, the base 1 serves as a hydraulic piston cylinder, and the lifting drive component 5 is a piston located inside the piston chamber 11, and the piston moves along the piston chamber 11 under the action of a hydraulic pressure. In the solution shown in FIG. 7, the piston chamber 11 is further provided with top shaft 72. An upper end of the piston is supported against the top shaft 72. An upper end of the top shaft 72 passes through the base 1 and is supported against bearing seat 73. The bearing seat 73 is provided above the base 1. The support assembly 6 is provided on the bearing seat 73.

In the solution shown in FIG. 3, an upper end of the piston chamber 11 directly forms the bearing seat 73.

Figure 8:
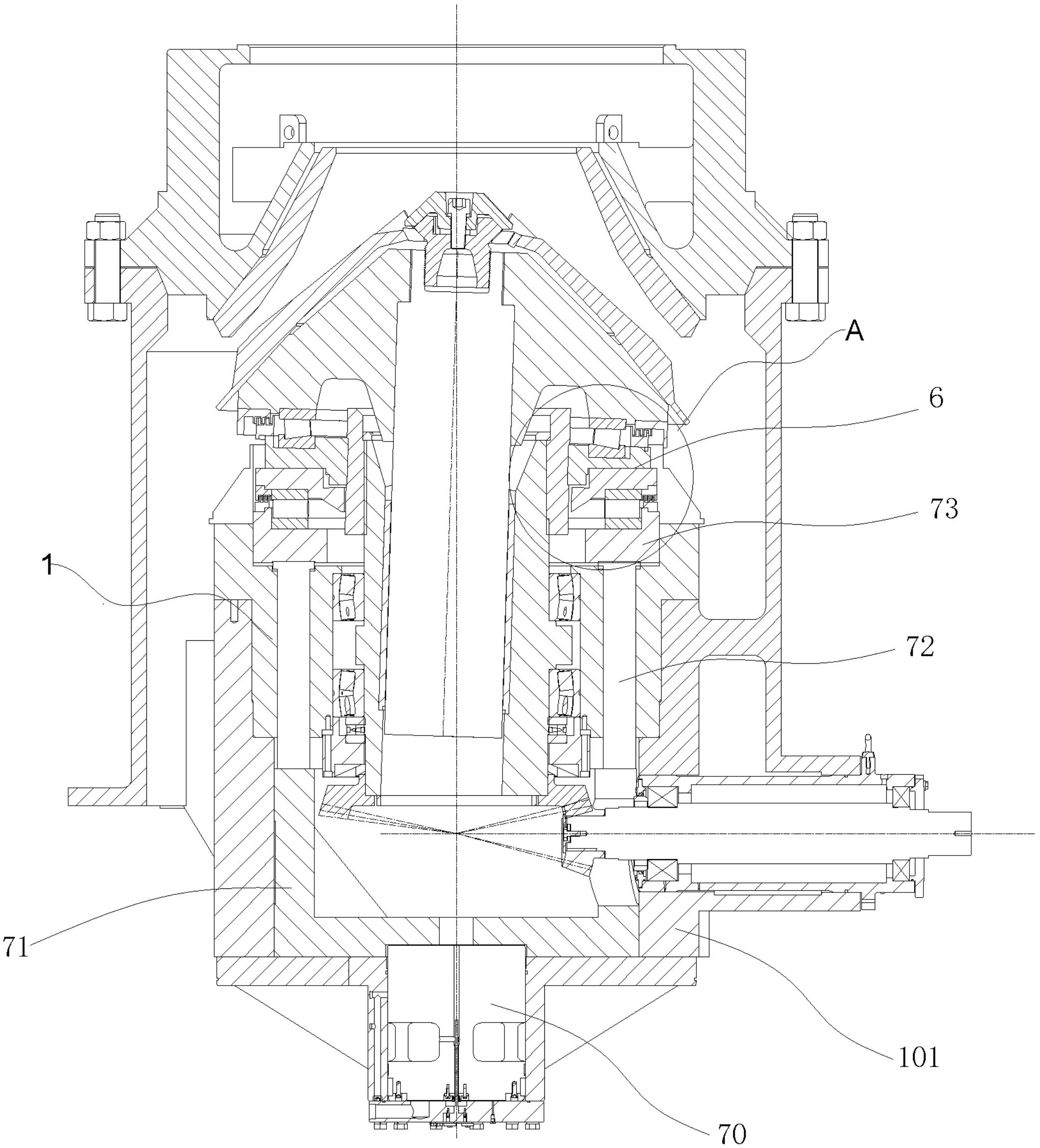
FIG. 8 is a structural diagram of a moving cone assembly with a single cylinder.

In another alternative solution (as shown in FIG. 8), hydraulic cylinder 70 is provided in the lower frame 101 below the base 1. An upper end surface of the hydraulic cylinder 70 is provided with lifting seat 71. Top shaft 72 that is movable and runs through upper and lower end surfaces of the base 1 is provided inside the base 1. A lower end of the top shaft 72 is provided on the lifting seat 71. An upper end of the top shaft 72 passes through the base 1 and is supported against the bearing seat 73. The bearing seat 73 is provided above the base 1. The support assembly 6 is provided on the bearing seat 73.

In the above solutions, hydraulic lifting is controlled through the oil passage to achieve lifting drive. The hydraulic lifting method has the advantages of high strength, high stability, and easy control through a hydraulic valve. The hydraulic lifting method can especially achieve the adjustment of a discharge port of the crushing chamber during operation. Further, the hydraulic lifting method can accurately set the pressure value and play a role in tramp metal protection. That is, when an uncrushable tramp metal falls into the discharge port of the crushing chamber, moving cone lining plate 41 is subjected to a greater downward pressure. An appropriate hydraulic value allows the moving cone body 4 and the main shaft 3 to travel down for a certain distance to allow the tramp metal to pass through. After the tramp metal is discharged, the moving cone body and the main shaft can quickly reset and work. This design ensures the normal operation of the equipment.

The eccentric drive solution provided by this embodiment is shown in FIGS. 1 to 6. The support assembly 6 is sleeved on the outer side of the eccentric bushing 2, and performs circumferential linkage and axial sliding with the eccentric bushing 2. The upper end surface of the support assembly 6 forms a continuous inclined surface that gradually changes in a circumferential height. A lower end surface of the support assembly 6 is supported by rolling or sliding on an upper end surface of the lifting drive component 5. The lower end of the moving cone body 4 is supported by rolling or sliding on a continuous inclined surface of the support assembly 6. The eccentric bushing 2 drives the moving cone body 4 to swing circumferentially through the support assembly 6. In this solution, the outer side of the eccentric bushing 2 is provided with the support assembly 6 that is in circumferential linkage with the eccentric bushing. Circumferential linkage means that the eccentric bushing 2 drives the support assembly 6 to rotate when it rotates. In this solution, the lower end of the support assembly 6 is supported by the lifting drive component 5, and the upper end surface of the support assembly 6 forms a continuous inclined surface that gradually changes in a circumferential height. The lower end of the moving cone body 4 is supported by rolling on the support assembly 6. In this solution, when the eccentric bushing 2 rotates, it directly drives the main shaft 3 and the moving cone body 4 on the main shaft to swing circumferentially, and drives the support assembly 6 to rotate, such that the moving cone body 4 swings, with an edge undulating, in a circumferential direction.

Based on this structure, during the operation of the moving cone assembly, the eccentric bushing 2 drives the support assembly 6 to rotate so as to swing the moving cone body 4, and the moving cone body 4 is supported by the base 1. The design simplifies the supporting structure of the moving cone body 4 and optimizes the load-bearing structure. The pressure of the eccentric bushing is transmitted to the base 1 and further to the lower frame 101, thereby improving the operational stability of the moving cone assembly and extending the service life of the equipment.

In a specific implementation solution, the support assembly 6 includes lower support ring 61 and upper support ring 62. The lower support ring 61 is directly or indirectly sleeved on the outer side of the eccentric bushing 2, and performs circumferential linkage and axial sliding with the eccentric bushing 2. The upper support ring 62 is provided above the lower support ring 61, and performs circumferential linkage and radial sliding with the lower support ring 61. The lower support ring 61 is provided by rolling on the upper end surface of the lifting drive component 5. An upper end surface of the upper support ring 62 forms a continuous inclined surface that gradually changes in a circumferential height, and the lower end of the moving cone body 4 is supported by rolling or sliding on the upper support ring 62. In this solution, the support assembly 6 is divided into two parts: the lower support ring 61 and the upper support ring 62. The lower support ring 61 is configured to connect the eccentric bushing 2 for circumferential synchronous rotation with the eccentric bushing. The upper support ring 62 is circumferentially synchronized with the lower support ring 61 to achieve radial sliding adjustment. In this way, when the lifting drive component 5 drives the support assembly 6, the moving cone body 4, and the main shaft 3 to move up and down, a radial misalignment of the lifting drive component caused during height adjustment of the moving cone assembly is compensated.

Figure 9:
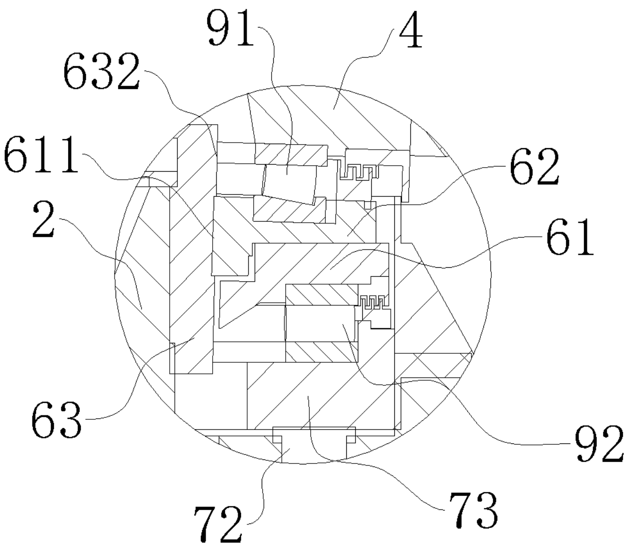
FIG. 9 is an enlarged view of A shown in FIG. 8.
Figure 10:
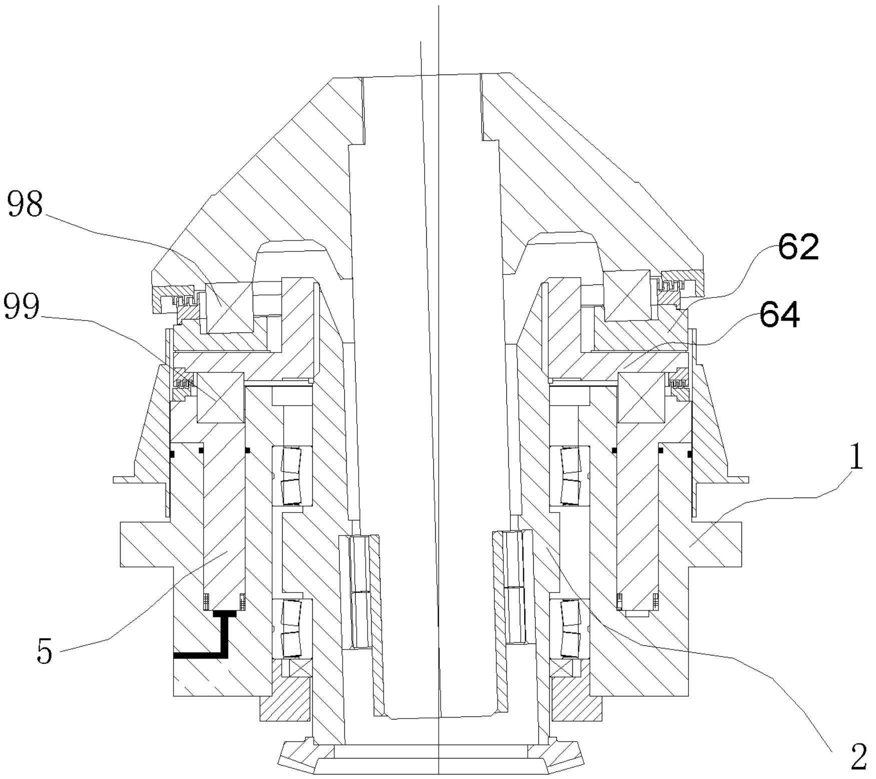
FIG. 10 is a structural diagram of a moving cone assembly with a lower support ring directly connected to an eccentric bushing.

In the further solutions shown in FIGS. 1 to 10, an outer wall of the eccentric bushing 2 is axially provided with eccentric bushing sliding grooves 26, and an inner ring of the lower support ring 61 is provided with internal key teeth 611 embedded in the eccentric bushing sliding grooves 26. In a solution, the internal key teeth 611 are clamped into the eccentric bushing sliding grooves 26 and can move along the eccentric bushing sliding grooves 26. In this solution, the lower support ring 61 is directly engaged and linked with the outer wall of the eccentric bushing 2. In another solution, connecting ring 63 and the lower support ring 61 shown in FIG. 2 form component 64, as shown in FIG. 10.

In another implementation solution shown in FIGS. 1 and 3 to 6, the outer wall of the eccentric bushing 2 is sleeved with the connecting ring 63, and the lower support ring 61 is sleeved on the connecting ring 63. The eccentric bushing 2, the connecting ring 63, and the lower support ring 61 are circumferentially linked. In this solution, the connecting ring 63 serves as an intermediate connecting element with inner and outer sides respectively connected to the eccentric bushing 2 and the lower support ring 61. Specifically, the connecting ring 63 includes an inner ring provided with inner sliding grooves 631 and an outer ring provided with outer sliding grooves 632. The inner sliding grooves 631 are engaged with the eccentric bushing sliding grooves 26, and the outer sliding grooves 632 are engaged with the internal key teeth 611. Further, in this solution, at least one of the inner side and the outer side of the connecting ring 63 achieves axial sliding. Specifically, only the inner side achieves axial sliding, that is, the connecting ring 63 and the eccentric bushing 2 achieve axial sliding. Alternatively, only the outer side achieves axial sliding, that is, the connecting ring 63 and the lower support ring 61 achieve axial sliding. Alternatively, both the inner and outer sides achieve axial sliding.

In the solutions shown in FIGS. 8 and 9, the upper support ring 62 is directly or indirectly sleeved on the outer side of the eccentric bushing 2, and performs circumferential linkage and axial sliding with the eccentric bushing 2. The inner ring or the upper support ring 62 is provided with the internal key teeth 611 that are embedded in the eccentric bushing sliding grooves 26. The internal key teeth 611 are clamped into the eccentric bushing sliding grooves 26 and are movable along the eccentric bushing sliding grooves 26. Alternatively, the internal key teeth 611 are engaged with the outer sliding grooves 632 of the connecting ring 63 to achieve up and down sliding.

Figure 5:
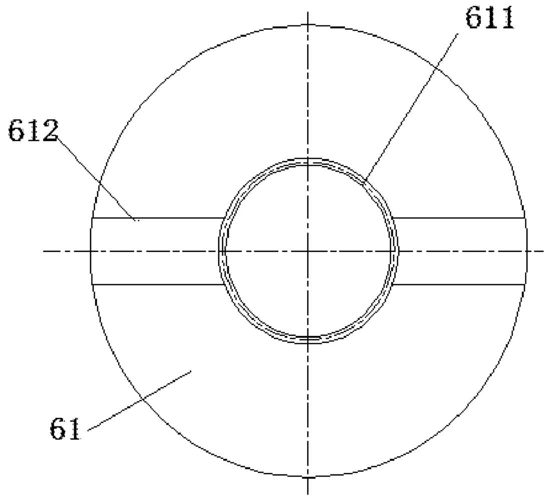
FIG. 5 is a structural diagram of a lower support ring.
Figure 6:
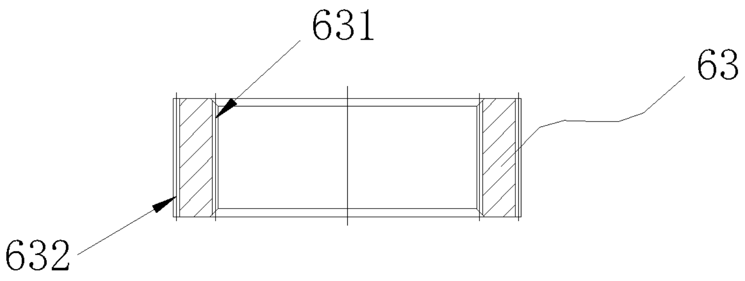
FIG. 6 is a structural diagram of a connecting ring.

In further solutions, as shown in FIGS. 1 and 5, an upper end surface of the lower support ring 61 and a lower end surface of the upper support ring 62 respectively form a sliding groove and slider 612 that are radially arranged. The slider 612 is embedded in the sliding groove to achieve circumferential linkage and radial sliding between the upper support ring 62 and the lower support ring 61.

As shown in FIG. 1, a top surface of the upper support ring 62 is recessed downwards to form top bearing groove 622, and a bottom surface of the top bearing groove 622 forms a continuous inclined surface that gradually changes in a circumferential height. First rolling bearing 91 is embedded in the top bearing groove 622, and the lower end of the moving cone body 4 is supported on the continuous inclined surface of the upper support ring 62 through the first rolling bearing 91. In this solution, the first rolling bearing 91 is positioned in the top bearing groove 622. The first rolling bearing 91 realizes rolling support between the moving cone body 4 and the upper support ring 62. A bottom surface of the lower support ring 61 and a top surface of the lifting drive component 5 each form bottom bearing groove 613. Second rolling bearing 92 is provided in the bottom bearing groove 613, and a lower end surface of the lower support ring 61 is supported on the lifting drive component 5 through the second rolling bearing 92. In this solution, the lower end of the lower support ring 61 is supported by the second rolling bearing 92 on the lifting drive component 5, such that the pressure of the moving cone body 4 is ultimately transferred from the base 1 to the lower frame, and the second rolling bearing 92 ensures smooth circumferential rotation of the support assembly.

The first rolling bearing 91 and the second rolling bearing 92 are thrust bearings, each with an outer side sealed by a labyrinth sealing ring.

Figure 11:
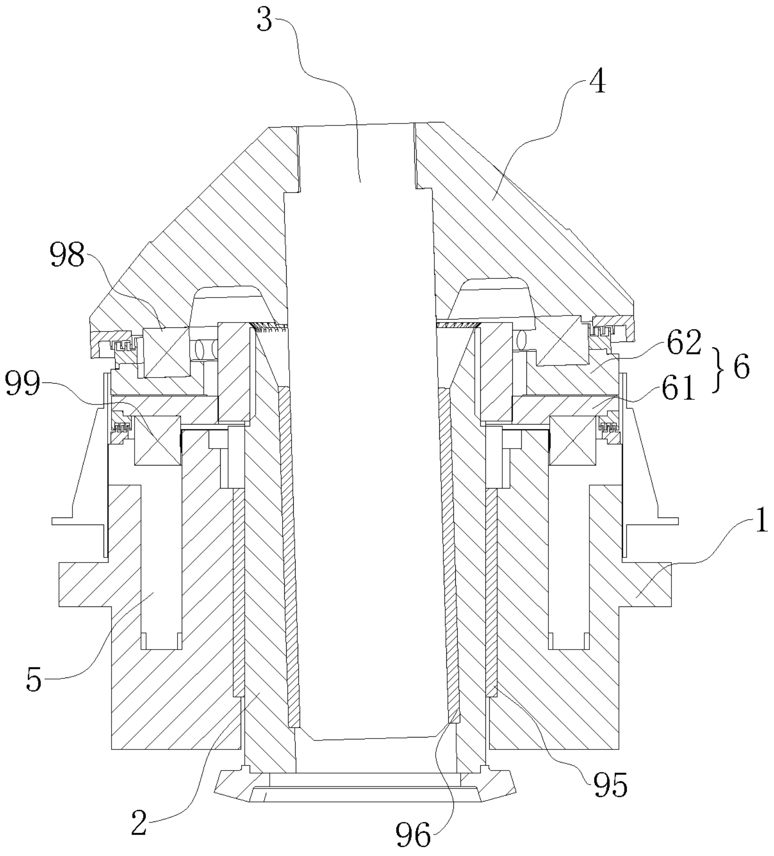
FIG. 11 is a structural diagram of a moving cone assembly with an inner copper sleeve and an outer copper sleeve.

In addition, in the implementation solutions shown in FIGS. 10 and 11, the first rolling bearing 91 and the second rolling bearing 92 shown in FIG. 1 are replaced with first sliding bearing 98 and second sliding bearing 99 respectively. In this solution, the first sliding bearing 98 and the second sliding bearing 99 achieve the above effect through sliding support.

Figure 4A:
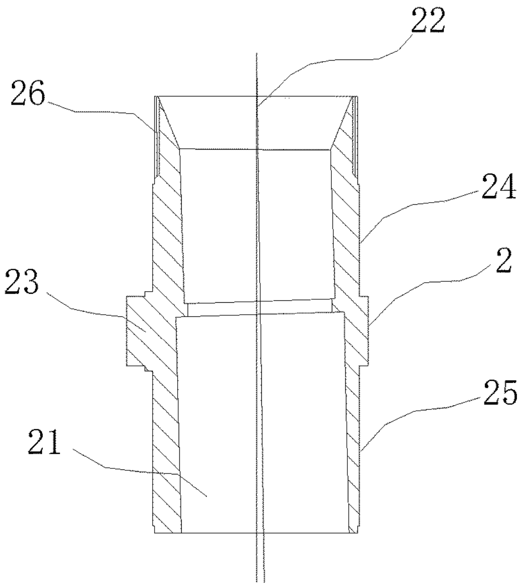
FIG. 4A is a structural diagram of a rolling bearing and an eccentric bushing of the moving cone assembly.
Figure 4B:
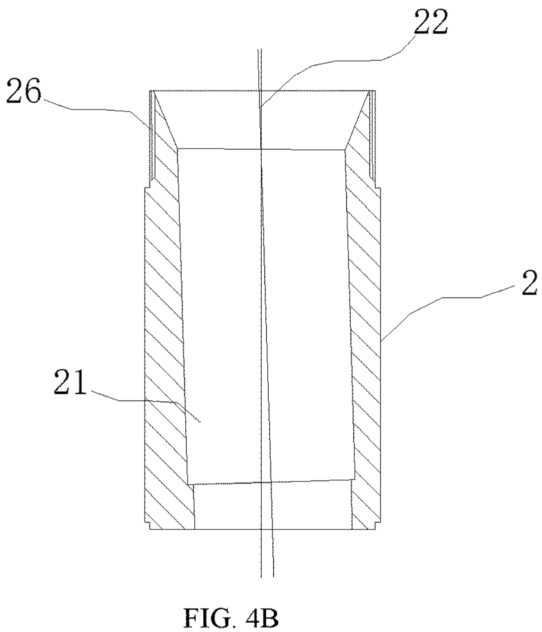
FIG. 4B is a structural diagram of a sliding bearing and an eccentric bushing of the moving cone assembly.

As shown in FIG. 4B, the eccentric bushing 2 includes a bottom part provided with eccentric part 21 and a top part provided with concentric part 22. The main shaft 3 enters from the top part of the eccentric bushing 2 and extends at least to the eccentric part 21 of the eccentric bushing 2. The support assembly 6 shown in FIG. 1 is sleeved on an outer side of the concentric part 22 of the eccentric bushing 2 and is in circumferential linkage with the concentric part 22. In this solution, the eccentric bushing 2 is divided into two parts: the eccentric part 21 and the concentric part 22. The main shaft 3 enters from the top part of the eccentric bushing 2 and extends at least to the eccentric part 21 of the eccentric bushing 2. In this way, when the eccentric bushing 2 rotates, it can drive the main shaft 3 and the moving cone body 4 on the main shaft to swing. The support assembly is provided on the outer side of the concentric part 22 of the eccentric bushing 2 to ensure that the eccentric bushing 2 drives the support assembly to rotate.

In the implementation solution shown in FIG. 11, the outer side of the eccentric bushing 2 and an inner wall of the base 1 are in an clearance fit through outer copper sleeve 95, and an inner wall of the eccentric bushing 2 and an outer wall of the main shaft 3 are in an clearance fit through inner copper sleeve 96. On the basis of the above structure, in this solution, the eccentric bushing 2 and the main shaft 3 are in a clearance fit through the inner copper sleeve and the outer copper sleeve 95. Compared to the existing eccentric structure, this solution improves the compressive strength of the entire machine.

Figure 12:
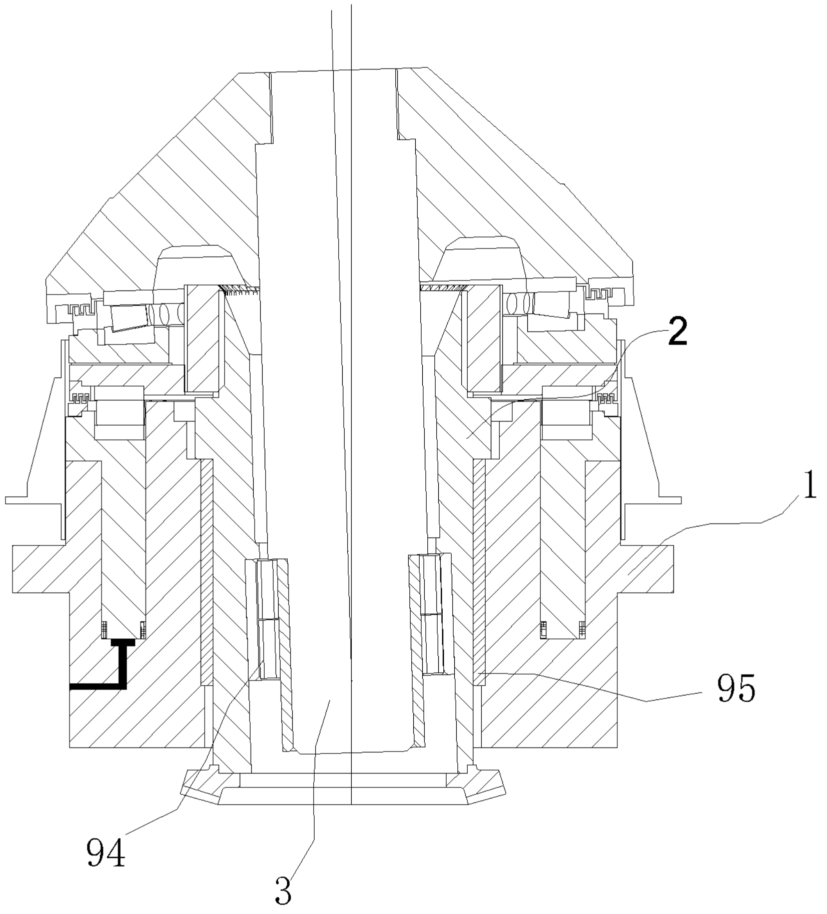
FIG. 12 is a structural diagram of a moving cone assembly with an inner bearing and an outer copper sleeve.
Figure 13:
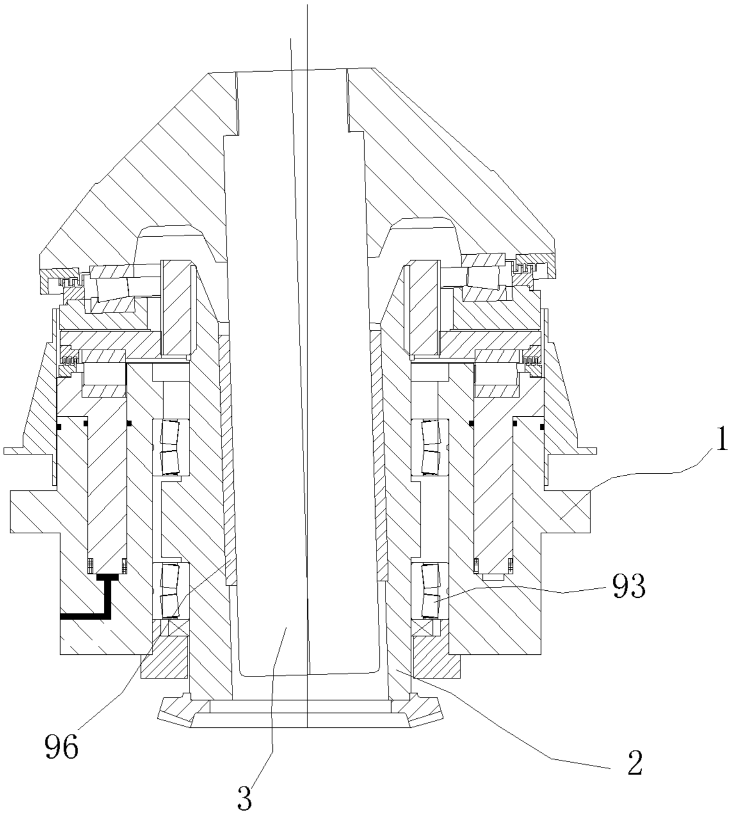
FIG. 13 is a structural diagram of a moving cone assembly with an inner copper sleeve and an outer bearing.

Of course, alternatively, as shown in FIG. 13, the eccentric bushing 2 and the base 1 are in a rotation fit through outer bearing 93, and the eccentric bushing 2 and the main shaft 3 are in a clearance fit through the inner copper sleeve 96. Alternatively, as shown in FIG. 12, the eccentric bushing 2 and the base 1 are in a clearance fit through the outer copper sleeve 95, and the eccentric bushing 2 and the main shaft 3 are in a rotation fit through inner bearing 94.

Figure 7:
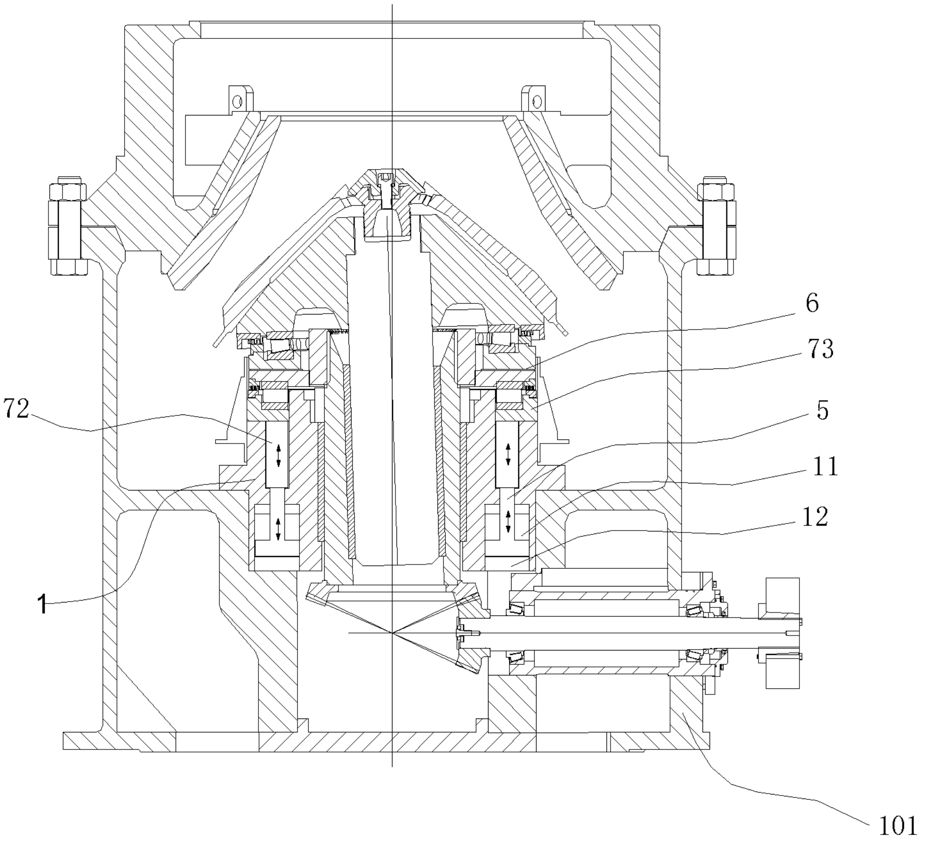
FIG. 7 is a structural diagram of a moving cone assembly with a plurality of independent pistons.

In another implementation solution shown in FIGS. 1 and 10, the outer side of the eccentric bushing 2 and the inner wall of the base 1 are in a rotation fit through the outer bearing 93, and the inner wall of the eccentric bushing 2 and the outer wall of the main shaft 3 are in a rotation fit through the inner bearing 94. In the above solution, the pressure of the moving cone body 4 is borne by the base 1. On this basis, the radial pressure of the eccentric bushing 2 is transmitted to the base 1 and further to the lower frame 101 (FIG. 7). In this way, the copper sleeve clearance fit can be replaced with a bearing rolling fit, which has the following advantages.

(1) The bearing rolling fit features a novel and unique structure and smooth operation (mainly reflected in reducing vibration caused by clearance).

(2) The bearing rolling fit replaces the sliding bearing with a rolling bearing to achieve rotation between the base and the eccentric bushing, as well as between the eccentric bushing and the main shaft. The rolling bearing increases the speed of the eccentric bushing, improving the crushing efficiency and output of the cone crusher.

(3) The bearing rolling fit reduces the friction coefficient between the eccentric bushing and the main shaft, prolongs the service life of the machine, and reduces the energy consumption of the equipment.

In a specific implementation solution, as shown in FIGS. 4A and 1, an outer wall of the eccentric part 21 of the eccentric bushing 2 radially protrudes to form eccentric ring part 23. The eccentric ring part 23 axially separates the outer wall of the eccentric bushing 2 into upper bearing mounting surface 24 and lower bearing mounting surface 25. The upper bearing mounting surface 24 and the lower bearing mounting surface 25 are respectively provided with outer bearings 93, and are positioned and separated by the eccentric ring part 23. In this solution, considering the larger radial space required for bearing mounting, the upper bearing mounting surface 24 and the lower bearing mounting surface 25 are formed on the outer wall of eccentric bushing 2 for mounting the two sets of outer bearings 93 respectively. The eccentric ring part 23 plays a role in eccentric driving and in spacing and positioning the two sets of outer bearings 93. In this solution, the lower support ring 61 or the upper support ring 62 or the connecting ring 63 is detachably connected to the outer side wall of the eccentric bushing 2 and is in circumferential linkage with the eccentric bushing 2. The lower end of the base 1 is fixedly connected to bottom support cover 13, and the bottom support cover 13 supports the outer bearing 93 at a lower side. In this solution, in order to facilitate the disassembly and assembly of the two sets of outer bearings 93, the support assembly and the eccentric bushing 2 are separated, thereby facilitating the disassembly and assembly of the upper outer bearing 93. The bottom support cover 13 below is configured to support the lower outer bearing 93, and the bottom support cover 13 can be disassembled when the outer bearing 93 needs to be disassembled.

In the solutions shown in FIGS. 11 and 13, the lower end of the main shaft 3 passes through the inner copper sleeve 96 and can perform axial movement and circumferential rotation relative to the inner copper sleeve 96. In the solutions shown in FIGS. 1, 10, and 12, the lower end of the main shaft 3 passes through an inner race of the inner bearing 94 and performs circumferential linkage and axial sliding with the inner race. In the above solution, the moving cone body 4 and the main shaft 3 are driven to move up and down through the lifting drive component 5. On this basis, in order to ensure axial movement of the main shaft 3 relative to the eccentric bushing 2, clearance fit is employed to perform axial movement when the inner copper sleeve 96 is provided for connecting. When the inner bearing 94 is provided for rotation connection, while the circumferential synchronous rotation is ensured, the main shaft 3 can perform axial movement relative to the inner race.

Embodiment 2

Figure 14:
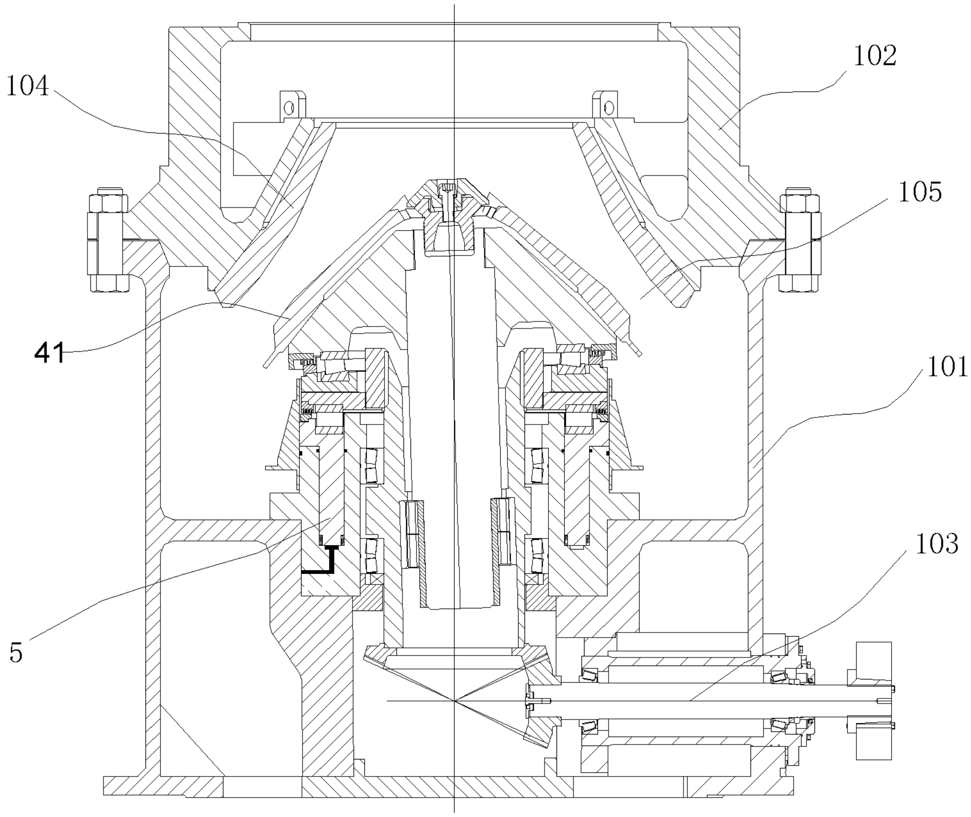
FIG. 14 is a structural diagram of a cone crusher according to Embodiment 2 of the present disclosure.

As shown in FIG. 14, this embodiment provides a cone crusher. The cone crusher includes lower frame 101, upper frame 102, transmission system 103 and a moving cone assembly that are provided inside the lower frame 101, and fixed cone lining plate 104 provided inside the upper frame 102. Crushing chamber 105 is formed between moving cone lining plate 41 of the moving cone assembly and the fixed cone lining plate 104. The moving cone assembly is the adjustable moving cone assembly as described in Embodiment 1. In the cone crusher with the adjustable moving cone assembly, the fixed cone lining plate 104 is fixedly provided, and there is no need for a discharge port adjustment structure, thereby simplifying the structure, reducing the components, and reducing costs.

Embodiment 3

Figure 15:
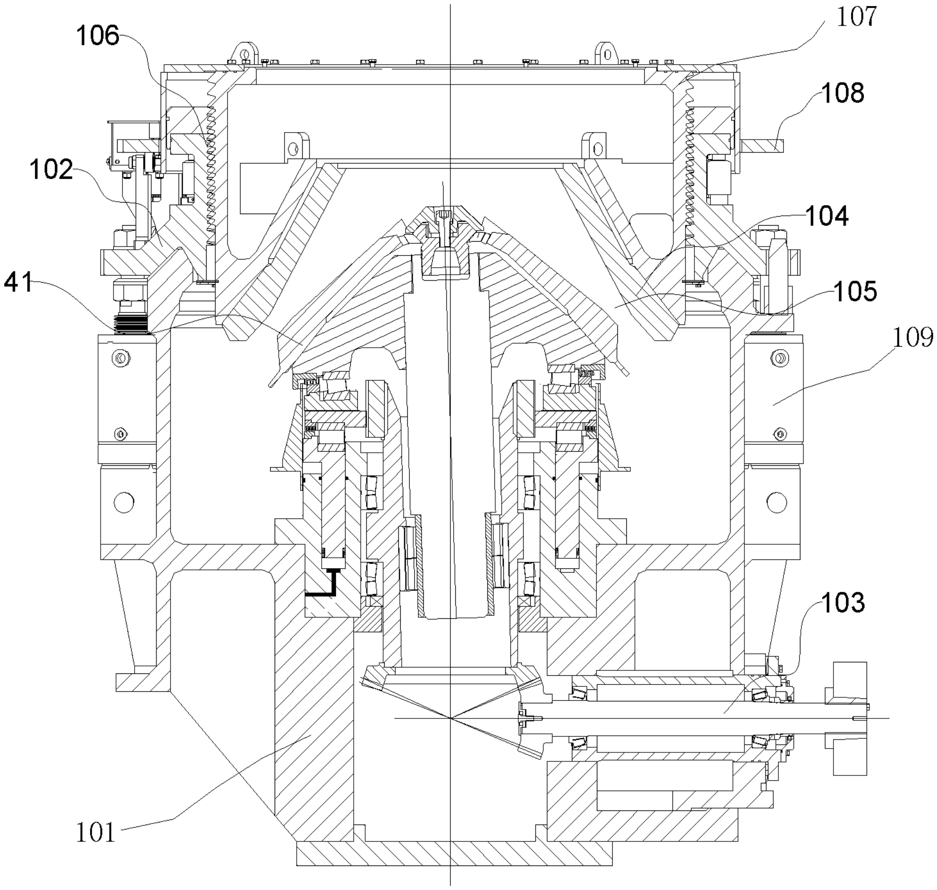
FIG. 15 is a structural diagram of a device featuring tramp metal dual protection and ultra-thick lining plates according to Embodiment 3 of the present disclosure.
Figure 16:
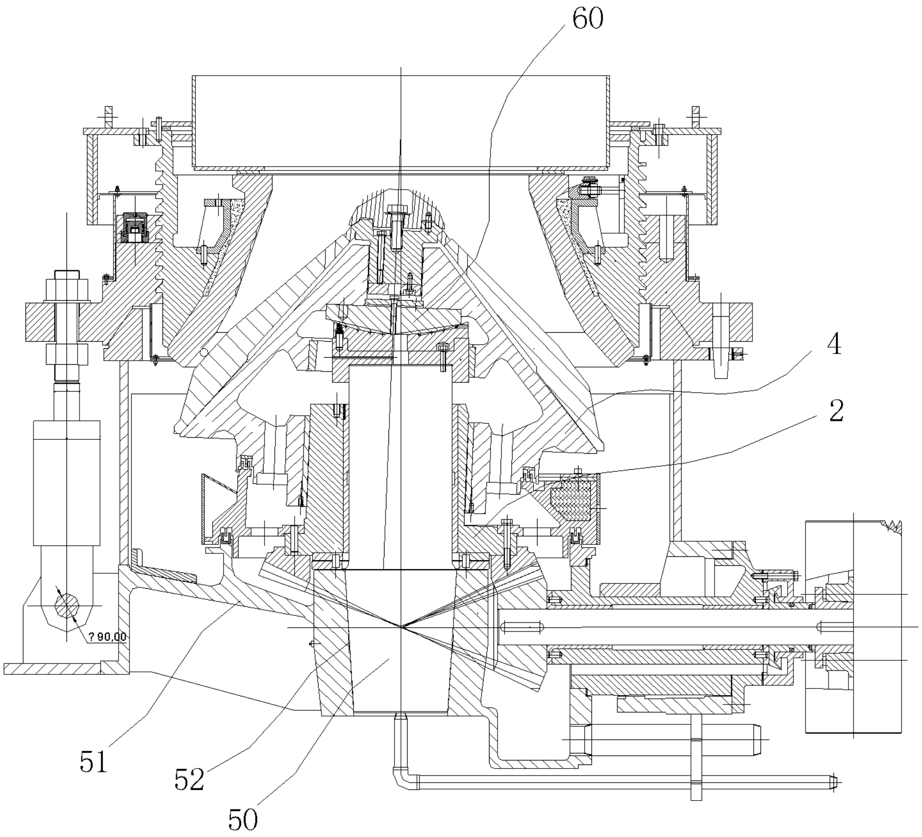
FIG. 16 (Prior Art)
FIG. 16 is a structural diagram of an existing cone crusher.

As shown in FIG. 15, this embodiment provides a cone crusher. The cone crusher includes lower frame 101, and upper frame 102, transmission system 103 and a moving cone assembly that are provided inside the lower frame 101. Crushing chamber 105 is formed between moving cone lining plate 41 of the moving cone assembly and the fixed cone lining plate 104. The moving cone assembly is the adjustable moving cone assembly as described in Embodiment 1.

In this solution, in the cone crusher with the adjustable moving cone assembly, the fixed cone assembly can adopt the upper frame structure of the existing multi-cylinder cone crusher. Specifically, in this solution, the fixed cone lining plate 104 is provided in the upper frame 102 through fixed cone adjustment device 106. The fixed cone adjustment device 106 is configured to adjust a diameter of the crushing chamber 105 between the fixed cone lining plate 104 and the moving cone lining plate 41. The fixed cone adjustment device 106 is prior art, which drives large gear ring 108 to rotate so as to drive fixed cone support 107 to rotate. In this way, axial movement is achieved based on a threaded fit, thereby adjusting the size of the crushing chamber 105 between the moving cone lining plate 41 and the fixed cone lining plate 104. In this solution, adjustable strokes of the moving cone assembly and the fixed cone lining plate are superimposed, increasing the adjustment range, such that the fixed cone lining plate 104 and the moving cone lining plate 41 can be ultra-thick lining plates. The original fixed cone lining plate 104 and moving cone lining plate 41 have a thickness of approximately 100 mm. In this solution, the thickness of the ultra-thick lining plate is increased to about 200 mm. In case wear of the ultra-thick lining plate occurs, automatic or manual lifting compensation can be carried out, thereby extending the service life of the lining plate, improving the utilization of the lining plate, reducing the replacement frequency, reducing costs, and improving efficiency.

Further, a plurality of lifting hydraulic cylinders 109 are provided between the lower frame 101 and the upper frame 102. The plurality of lifting hydraulic cylinders 109 are distributed circumferentially along an outer side wall of the lower frame 101. A lower end of each of the lifting hydraulic cylinders 109 is hinged to the lower frame 101. A piston shaft of each of the lifting hydraulic cylinders 109 is fixedly connected to the upper frame 102. In case a large tramp metal enters the crushing chamber, a hydraulic system increases its pressure. After the pressure exceeds a set value, the piston shaft of the lifting hydraulic cylinder 109 close to the tramp metal is lifted. Thus, the upper frame is raised, and the moving cone assembly is lowered to increase the discharge port, allowing the tramp metal to pass quickly, thereby reducing the impact on the frame, the bearing, and other components. The adjustable moving cone assembly is combined with the upper frame and fixed cone assembly of the existing multi-cylinder cone crusher, providing dual protection against the tramp metal and using the ultra-thick lining plates.

In this specification, descriptions of reference terms such as “one embodiment”, “some embodiments”, “an example”, “a specific example”, and “some examples” indicate that specific features, structures, materials, or characteristics described in combination with the embodiment(s) or example(s) are included in at least one embodiment or example of the present disclosure. In this specification, the schematic representations of the above terms do not necessarily refer to the same embodiment or example. In addition, the specific features, structures, materials, or characteristics described may be combined in any suitable manner in any one or more embodiments or examples.

Although the embodiments of the present disclosure have been illustrated and described above, it can be understood that the above embodiments are exemplary and cannot be construed as a limitation to the present disclosure. A person of ordinary skill in the art may make various changes, modifications, replacements and variations to the above embodiments without departing from the principle and spirit of the present disclosure.

What is claimed is:

1. An adjustable moving cone assembly, comprising a base, an eccentric bushing movably provided inside the base, a main shaft with a lower end movably provided inside the eccentric bushing, and a moving cone body fastened at an upper end of the main shaft, wherein the eccentric bushing rotates to directly or indirectly drive the moving cone body to swing circumferentially; a lifting drive component is provided on the base; an output end of the lifting drive component is provided with a support assembly; a lower end of the moving cone body is supported by rolling or sliding on the support assembly; and the lifting drive component is configured to drive the moving cone body, the main shaft connected to the moving cone body, and the support assembly to move up and down; and the support assembly is sleeved on an outer side of the eccentric bushing, and performs circumferential linkage and axial sliding with the eccentric bushing; an upper end surface of the support assembly forms a continuous inclined surface that gradually changes in a circumferential height; a lower end surface of the support assembly is supported on an upper end surface of the lifting drive component; the lower end of the moving cone body is supported on the continuous inclined surface of the support assembly; and the eccentric bushing drives the moving cone body to swing circumferentially through the support assembly.

2. The adjustable moving cone assembly according to claim 1, wherein the support assembly comprises a lower support ring and an upper support ring; the lower support ring or the upper support ring is directly or indirectly sleeved on the outer side of the eccentric bushing, and performs circumferential linkage and axial sliding with the eccentric bushing; the upper support ring is provided above the lower support ring, and performs circumferential linkage and radial sliding with the upper support ring; the lower support ring is provided by rolling or sliding on the upper end surface of the lifting drive component; an upper end surface of the upper support ring forms a continuous inclined surface that gradually changes in a circumferential height; and the lower end of the moving cone body is supported by rolling or sliding on the upper support ring.

3. The adjustable moving cone assembly according to claim 2, wherein a top surface of the upper support ring is recessed downwards to form a top bearing groove; a bottom surface of the top bearing groove forms a continuous inclined surface that gradually changes in a circumferential height; a first rolling bearing or a first sliding bearing is embedded in the top bearing groove; and the lower end of the moving cone body is supported on the continuous inclined surface of the upper support ring through the first rolling bearing or the first sliding bearing.

4. The adjustable moving cone assembly according to claim 2, wherein a bottom surface of the lower support ring and a top surface of the lifting drive component each form a bottom bearing groove; a second rolling bearing or a second sliding bearing is provided in the bottom bearing groove; and a lower end surface of the lower support ring is supported on the top surface of the lifting drive component through the second rolling bearing or the second sliding bearing.

5. The adjustable moving cone assembly according to claim 2, wherein an outer wall of the eccentric bushing is axially provided with eccentric bushing sliding grooves; an inner ring of the lower support ring or the upper support ring is provided with internal key teeth embedded in the eccentric bushing sliding grooves; and the internal key teeth are clamped into the eccentric bushing sliding grooves and are movable along the eccentric bushing sliding grooves;

or wherein the outer wall of the eccentric bushing is sleeved with a connecting ring; the lower support ring or the upper support ring is sleeved on the connecting ring; the eccentric bushing, the connecting ring, and the lower support ring or the upper support ring are circumferentially linked; the connecting ring comprises an inner ring provided with inner sliding grooves and an outer ring provided with outer sliding grooves; the inner sliding grooves are engaged with the eccentric bushing sliding grooves; the outer sliding grooves are engaged with the internal key teeth; and at least one of an inner side and an outer side of the connecting ring achieves axial sliding.

6. The adjustable moving cone assembly according to claim 2, wherein an upper end surface of the lower support ring and a lower end surface of the upper support ring respectively form a sliding groove and a slider that are radially arranged; and the slider is embedded in the sliding groove to achieve circumferential linkage and radial sliding between the upper support ring and the lower support ring.

7. The adjustable moving cone assembly according to claim 5, wherein the eccentric bushing comprises a bottom part provided with an eccentric part and a top part provided with a concentric part; the main shaft enters from the top part of the eccentric bushing and extends at least to the eccentric part of the eccentric bushing; and the support assembly is sleeved on an outer side of the concentric part of the eccentric bushing and is in circumferential linkage with the concentric part.

8. The adjustable moving cone assembly according to claim 7, wherein the outer side of the eccentric bushing and an inner wall of the base are in an clearance fit through an outer copper sleeve or in a rotation fit through outer bearings; and an inner wall of the eccentric bushing and an outer wall of the main shaft are in an clearance fit through an inner copper sleeve or are in a rotation fit through an inner bearing.

9. The adjustable moving cone assembly according to claim 8, wherein an outer wall of the eccentric part of the eccentric bushing radially protrudes to form an eccentric ring part; the eccentric ring part axially separates an outer wall of the eccentric bushing into an upper bearing mounting surface and a lower bearing mounting surface; and the upper bearing mounting surface and the lower bearing mounting surface are respectively provided with the outer bearings, and are positioned and separated by the eccentric ring part.

10. The adjustable moving cone assembly according to claim 9, wherein the lower support ring or the upper support ring or the connecting ring is separated from an outer wall of an upper end of the eccentric bushing; the lower support ring or the upper support ring or the connecting ring is detachably connected to an outer side wall of the eccentric bushing and is in circumferential linkage with the eccentric bushing; a lower end of the base is fixedly connected to a bottom support cover; and the bottom support cover supports the outer bearing at a lower side.

11. The adjustable moving cone assembly according to claim 8, wherein the lower end of the main shaft passes through the inner copper sleeve and performs axial movement and circumferential rotation relative to the inner copper sleeve;

or wherein the main shaft passes through an inner race of the inner bearing and performs circumferential linkage and axial sliding with the inner race.

12. The adjustable moving cone assembly according to claim 1, wherein an upper end surface of the moving cone body is provided with an ultra-thick lining plate.

13. The adjustable moving cone assembly according to claim 1, wherein the base is circumferentially provided with a continuous or spaced piston chamber; the base or the base and a lower frame below the base form an oil passage communicated with the piston chamber; the lifting drive component is a piston located inside the piston chamber, and the piston moves along the piston chamber under an action of a hydraulic pressure; and an upper end of the piston directly forms or supports a bearing seat;

or wherein a hydraulic cylinder is provided in the lower frame below the base; an upper end surface of the hydraulic cylinder is provided with a lifting seat; a top shaft that is movable and runs through upper and lower end surfaces of the base is provided inside the base; a lower end of the top shaft is provided on the lifting seat; an upper end of the top shaft passes through the base and is supported against the bearing seat; the bearing seat is provided above the base; and the support assembly is provided on the bearing seat.

14. A cone crusher, comprising a lower frame, an upper frame, a transmission system and a moving cone assembly that are provided inside the lower frame, and a fixed cone lining plate provided inside the upper frame, wherein a crushing chamber is formed between a moving cone lining plate of the moving cone assembly and the fixed cone lining plate; and the moving cone assembly is the adjustable moving cone assembly according to claim 1.

15. The cone crusher according to claim 14, wherein the fixed cone lining plate is provided in the upper frame through a fixed cone adjustment device; and the fixed cone adjustment device is configured to adjust a diameter of the crushing chamber between the fixed cone lining plate and the moving cone lining plate.

16. The cone crusher according to claim 15, wherein the fixed cone lining plate and the moving cone lining plate are ultra-thick lining plates.

17. The cone crusher according to claim 14, wherein a plurality of lifting hydraulic cylinders are provided between the lower frame and the upper frame; the plurality of lifting hydraulic cylinders are distributed circumferentially along an outer side wall of the lower frame; a lower end of each of the plurality of lifting hydraulic cylinders is hinged to the lower frame; and a piston shaft of each of the plurality of lifting hydraulic cylinders is fixedly connected to the upper frame.

18. The cone crusher according to claim 14, wherein the support assembly comprises a lower support ring and an upper support ring; the lower support ring or the upper support ring is directly or indirectly sleeved on the outer side of the eccentric bushing, and performs circumferential linkage and axial sliding with the eccentric bushing; the upper support ring is provided above the lower support ring, and performs circumferential linkage and radial sliding with the upper support ring; the lower support ring is provided by rolling or sliding on the upper end surface of the lifting drive component; an upper end surface of the upper support ring forms a continuous inclined surface that gradually changes in a circumferential height; and the lower end of the moving cone body is supported by rolling or sliding on the upper support ring.

19. The cone crusher according to claim 18, wherein a top surface of the upper support ring is recessed downwards to form a top bearing groove; a bottom surface of the top bearing groove forms a continuous inclined surface that gradually changes in a circumferential height; a first rolling bearing or a first sliding bearing is embedded in the top bearing groove; and the lower end of the moving cone body is supported on the continuous inclined surface of the upper support ring through the first rolling bearing or the first sliding bearing.

20. The cone crusher according to claim 18, wherein a bottom surface of the lower support ring and a top surface of the lifting drive component each form a bottom bearing groove; a second rolling bearing or a second sliding bearing is provided in the bottom bearing groove; and a lower end surface of the lower support ring is supported on the top surface of the lifting drive component through the second rolling bearing or the second sliding bearing.

* * * * *